(12) United States Patent
Zeng

(10) Patent No.: US 9,130,948 B2
(45) Date of Patent: Sep. 8, 2015

(54) METHOD AND APPARATUS FOR OPENING A BROWSER AND METHOD AND SERVER FOR SENDING A SPLASH SCREEN IMAGE

(71) Applicant: TENCENT TECHNOLOGY (SHENZHEN) COMPANY LIMITED, Shenzhen (CN)

(72) Inventor: Pengyun Zeng, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 241 days.

(21) Appl. No.: 13/875,244

(22) Filed: May 1, 2013

(65) Prior Publication Data

US 2013/0246585 A1 Sep. 19, 2013

Related U.S. Application Data

(63) Continuation of application No. PCT/CN2011/083360, filed on Dec. 2, 2011.

(30) Foreign Application Priority Data

Dec. 7, 2010 (CN) .......................... 2010 1 0589808

(51) Int. Cl.
*G06F 15/16* (2006.01)
*H04L 29/08* (2006.01)
(Continued)

(52) U.S. Cl.
CPC .............. *H04L 67/10* (2013.01); *G06F 3/0484* (2013.01); *G06F 9/445* (2013.01)

(58) Field of Classification Search
CPC ........ G06F 9/445; G06F 3/0484; H04L 67/10

USPC ........................................... 709/219; 715/760
See application file for complete search history.

(56) References Cited

U.S. PATENT DOCUMENTS 6,173,445 B1 * 1/2001 Robins et al. ................. 717/173
2002/0103941 A1 * 8/2002 Yip et al. ...................... 709/310
(Continued)

FOREIGN PATENT DOCUMENTS

CN 1841369 A 10/2006
CN 101339549 A 1/2009
(Continued)

OTHER PUBLICATIONS

Chinese First Examination Report of corresponding China Application No. 201010589808.X, dated Oct. 25, 2013.
(Continued)

*Primary Examiner* — Kostas Katsikis
(74) *Attorney, Agent, or Firm* — J.C. Patents

(57) ABSTRACT

A method for opening a browser includes: receiving a signal for starting up a browser and opening the browser; judging whether a locally stored first splash screen image is valid at the current time; if yes, displaying the first splash screen image, if not, displaying a local default second splash screen image; after the opening the browser, further including: sending first information to a server, wherein the first information includes client basic information and image information of the first splash screen image, wherein the client basic information includes a screen size of the client and a client attribute; receiving second information returned by the server according to the first information; and updating the locally stored first splash screen image according to the second information.

17 Claims, 6 Drawing Sheets

(51) Int. Cl.
　　*G06F 9/445*　　　(2006.01)
　　*G06F 3/0484*　　(2013.01)

(56) References Cited

U.S. PATENT DOCUMENTS

| | | | |
|---|---|---|---|
| 2007/0204222 A1 | 8/2007 | Rogan et al. | 715/539 |
| 2008/0288763 A1* | 11/2008 | Reik | 713/2 |
| 2009/0251488 A1* | 10/2009 | Clavel | 345/619 |
| 2009/0254605 A1* | 10/2009 | Clavel | 709/203 |
| 2011/0072360 A1* | 3/2011 | Patrick et al. | 715/744 |
| 2011/0234627 A1* | 9/2011 | Faulkner et al. | 345/619 |
| 2013/0055121 A1* | 2/2013 | Cho et al. | 715/764 |

FOREIGN PATENT DOCUMENTS

| | | |
|---|---|---|
| CN | 101383842 A | 3/2009 |
| CN | 101415088 A | 4/2009 |
| CN | 101521816 A | 9/2009 |
| WO | WO 2013032228 A1 * | 3/2013 |

OTHER PUBLICATIONS

International Search Report of International Application No. PCT/CN2011/083360, dated Mar. 15, 2012.

* cited by examiner

METHOD AND APPARATUS FOR OPENING A BROWSER AND METHOD AND SERVER FOR SENDING A SPLASH SCREEN IMAGE

CROSS-REFERENCE TO RELATED APPLICATIONS

This application is a continuation of International Application No. PCT/CN2011/083360, filed on Dec. 2, 2011, which claims priority to Chinese Patent Application No. 201010589808.X, filed on Dec. 7, 2010, both of which are hereby incorporated by reference in their entireties.

FIELD OF THE INVENTION

The present invention relates to the field of communication technology and, in particular, to a method and an apparatus for opening a browser and a method and a server for sending a splash screen image.

BACKGROUND OF THE INVENTION

With the improvement of mobile phone functions, browsing web pages has become a necessary function on a mobile phone. When opening and entering into a homepage, conventional browsers perform in several different ways:
1. Remain a black screen till the browser homepage is entered;
2. Present a loading progress bar till the browser homepage is entered;
3. Present a state welcome image till the browser homepage is entered.

After a study on the prior art, the inventor discovers that the prior art has at least the following defects:

The user gets a small amount of information when the browser is opened with one single image and, therefore, the user experience is poor.

SUMMARY OF THE INVENTION

Embodiments of the present invention provide a method and an apparatus for opening a browser and a method and a server for sending a splash screen image. The technical solutions are as follows:

A method for opening a browser includes:

receiving a signal for starting up a browser and opening the browser; and judging whether a locally stored first splash screen image is valid at a current time and if yes, displaying the first splash screen image, or if not, displaying a local default second splash screen image.

The judging whether a locally stored first splash screen image is valid at the current time includes:

extracting valid time and invalid time of the locally stored first splash screen image; and judging whether the current time is between the extracted valid time and invalid time and if yes, judging that the locally stored first splash screen image is valid, or if not, judging that the locally stored first splash screen image is invalid.

After the opening a browser, the method further includes:

sending first information to a server, where the first information includes client basic information and image information of the first splash screen image;

receiving second information returned by the server according to the first information; and updating the locally stored first splash screen image according to the second information.

The second information includes control information of the first splash screen image or a third splash screen image and control information of the third splash screen image sent by the server, and accordingly, wherein the updating the locally stored first splash screen image according to the second information includes:

updating the control information of the first splash screen image according to the control information of the first splash screen image sent by the server; and saving the third splash screen image and the control information of the third splash screen image as the first splash screen image and the control information of the first splash screen image.

A method for sending a splash screen image includes:

receiving first information sent by a client, where the first information includes client basic information and image information of a first splash screen image; and searching for a third splash screen image that matches the first information and sending the third splash screen image to the client.

The image information of the first splash screen image includes a first splash screen image feature string and correspondingly, the searching for a third splash screen image that matches the first information includes:

searching for a splash screen image that matches the client basic information; and judging whether the first splash screen image feature string is the same as the image feature string of the found splash screen image and if not, using the found splash screen image as the third splash screen image.

The searching for a splash screen image that matches the client basic information includes:

selecting from locally stored splash screen images a splash screen image that is configured for a location of the client and corresponds to a browser version of the client according to the location of the client.

After the selecting from locally stored splash screen images a splash screen image that is configured for the location of the client and corresponds to the browser version of the client according to the location of the client, the method further includes:

when there are multiple splash screen images that are configured for the location of the client and correspond to the browser version, selecting a splash screen image of higher priority.

The image information of the first splash screen image includes a control information feature string of the first splash screen image and correspondingly, the searching for a third splash screen image that matches the first information further includes:

when the first splash screen image feature string is the same as an image feature string of the found splash screen image, judging whether the control information feature string of the first splash screen image is the same as a control information feature string of the found splash screen image, and if not, using the found splash screen image as the third splash screen image and sending the third splash screen image to the client.

An apparatus for opening a browser includes:

a startup module, configured to receive a signal for starting up a browser and open the browser; and a display module, configured to judge whether a locally stored first splash screen image is valid at a current time and if yes, display the first splash screen image, or if not, display a local default second splash screen image.

The display module includes:

an extracting unit, configured to extract valid time and invalid time of the locally stored first splash screen image; and a judging unit, configured to judge whether the current time is between the extracted valid time and invalid time and if yes, judge that the locally stored first splash screen image is valid, or if not, judge that the locally stored first splash screen image is invalid.

The apparatus further includes:

a sending module, configured to send first information to a server, where the first information includes client basic information and image information of the first splash screen image;

a receiving module, configured to receive second information returned by the server according to the first information; and an updating module, configured to update the locally stored first splash screen image according to the second information.

The second information includes control information of the first splash screen image or a third splash screen image and control information of the third splash screen image sent by the server and accordingly, the updating module is configured to update the control information of the first splash screen image according to the server sent control information of the first splash screen image; and the updating module is further configured to save the third splash screen image and the control information of the third splash screen image as the first splash screen image and the control information of the first splash screen iamge.

A server includes:

a receiving module, configured to receive first information sent by a client, where the first information includes client basic information and image information of a first splash screen image; and a searching and sending module, configured to search for a third splash screen image that matches the first information and send the third splash screen image to the client.

The image information of the first splash screen image includes a first splash screen image feature string and accordingly, the searching and sending module includes:

a searching unit, configured to search for a splash screen image that matches the client basic information; and a judging unit, configured to judge whether the first splash screen image feature string is the same as the image feature string of the found splash screen image and if not, use the found splash screen image as the third splash screen image.

The searching unit is configured to select from locally stored splash screen images a splash screen image that is configured for a location of the client and corresponds to a browser version of the client according to the location of the client.

The searching and sending module is further configured to, when there are multiple splash screen images that are configured for the location of the client and correspond to the browser version, select a splash screen image of higher priority.

The judging unit is further configured to, when the first splash screen image feature string is the same as a image feature string of the found splash screen image, judge whether the control information feature string of the first splash screen image is the same as a control information feature string of the found splash screen image, and if not, use the found splash screen image as the third splash screen image and send the third splash screen image to the client.

The technical solutions provided in embodiments of the present invention provide the following benefit:

When the browser is opened, a splash screen image is displayed according to the locally stored control information of the splash screen image. This improves the visual effect when the software is applied and increases the amount of information available for the user. Besides, when necessary, some common prompts can be played to the user. The functions of the browser are thus enhanced.

BRIEF DESCRIPTION OF THE DRAWINGS

To better explain the technical solutions of the present invention or the prior art, the accompanying drawings needed in the description of embodiments of the invention or the prior art will be briefly described. It is apparent that the accompanying drawings illustrate only some exemplary embodiments of the invention and those skilled in the art can derive other drawings from these drawings without making any creative effort.

DETAILED DESCRIPTION OF THE EMBODIMENTS

To make purposes, technical solutions, and benefits of the present invention clearer, embodiments of the invention will be described hereinafter in detail with reference to the accompanying drawings.

Embodiment 1

Figure 1:
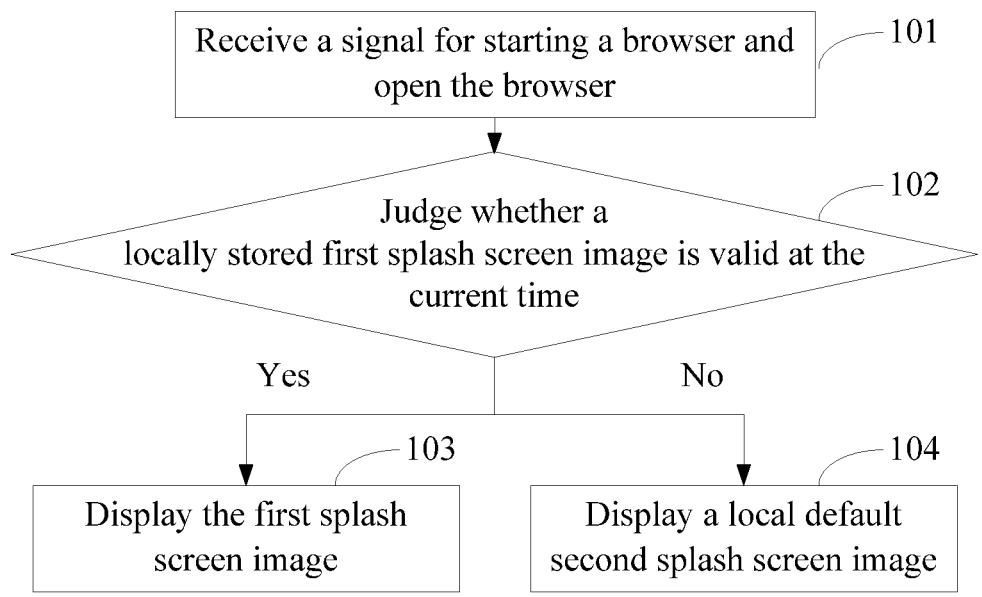
FIG. 1 is a flowchart of a method for opening a browser according to an embodiment of the invention.

To enhance functions of a browser and make the browser more user friendly, this embodiment of the invention provides a method for opening a browser. As shown in FIG. 1, the method includes:

101. Receive a signal for starting a browser and open the browser;

102. Judge whether a locally stored first splash screen image is valid at the current time;

If yes, step 103 is executed;

If not, step 104 is executed;

103. Display the first splash screen image;

104. Display a local default second splash screen image.

When the browser is opened, a splash screen image is played to a user according to the locally stored control information of the splash screen image. This improves the visual effect when the software is applied and increases the amount of information available for the user. Besides, when necessary, some common prompts can be played to the user. The functions of the browser are thus enhanced.

Embodiment 2

Figure 2:
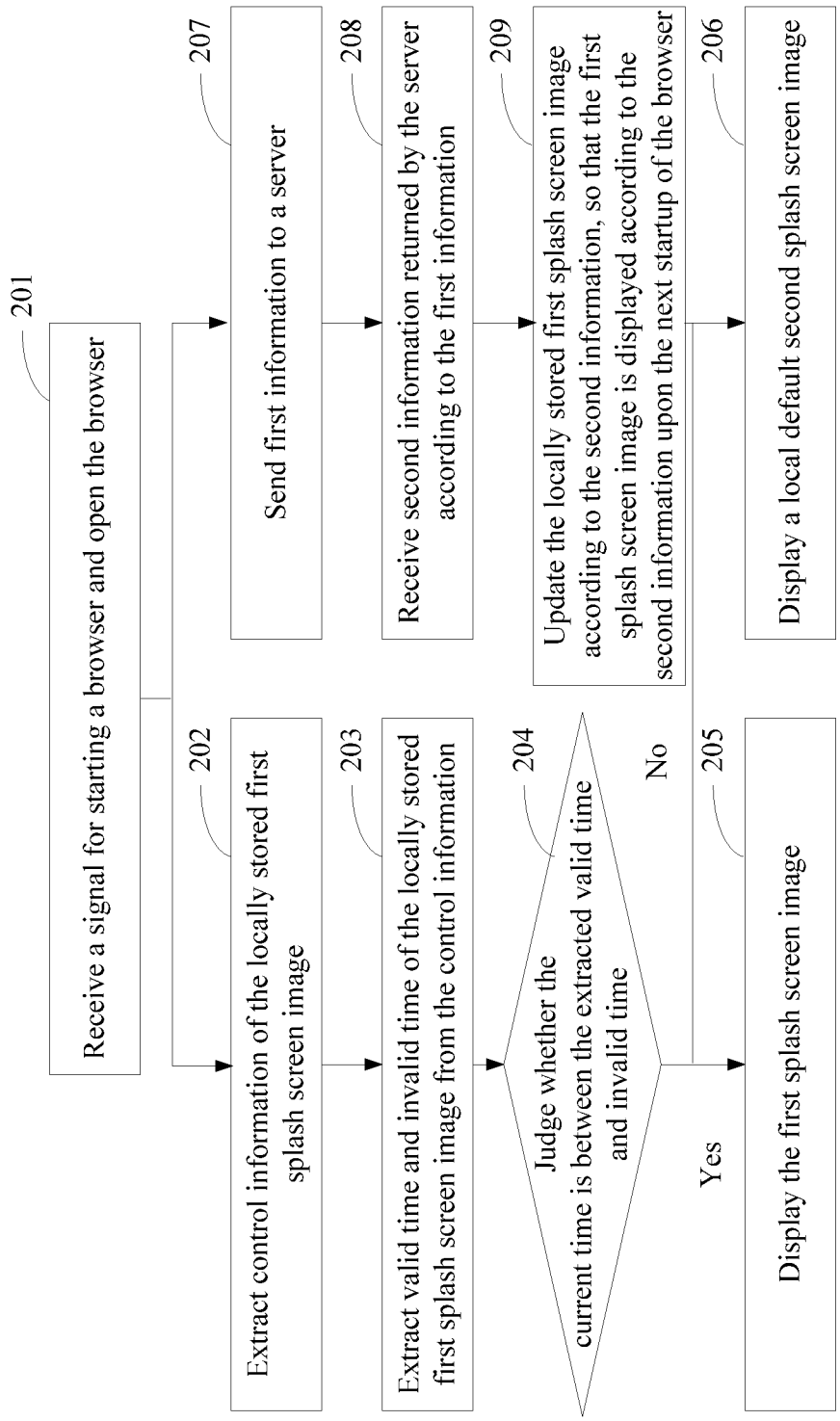
FIG. 2 is a flowchart of a method for opening a browser according to an embodiment of the invention.

To enhance functions of a browser and make the browser more user friendly, this embodiment of the invention provides a method for opening a browser. As shown in FIG. 2, the method includes:

201. Receive a signal for starting a browser and open the browser;

In an embodiment of the invention, the browser may be a mobile phone browser or a browser on any mobile terminal.

After the browser is opened, judge whether a first splash screen image stored locally is valid at the current time. This process of judgment includes the following steps 202-204:

202. Extract control information of the locally stored first splash screen image;

In an embodiment of the invention, the local end is a client which stores the first splash screen image and a second splash screen image. The client also stores the control information corresponding to the first splash screen image. The first splash screen image may be changed according to a service, such as a push service of a server, and may be information displayed to the user according to different festivals and important dates. The second splash screen image is a local default splash screen image and may be pulled by the client from the server when the browser is installed or updated.

Further, the second splash screen image may be any splash screen image downloaded by the client from the server according to a directive of the user. The server may provide different splash screen images for the user to download according to the user's desire.

203. Extract the valid time and invalid time of the locally stored first splash screen image from the control information;

In an embodiment of the invention, the control information includes: splash screen image content, valid time, invalid time, splash screen display time length, a splash screen image feature string, and a control information feature string of the corresponding splash screen image. The valid time is the start time when the splash screen image becomes valid, the invalid time is the start time when the splash screen image becomes invalid, the splash screen display time length is the duration when the splash screen image is displayed once, the splash screen image feature string is used to index to and identify the splash screen image, and the control information feature string is used to index and identity the control information. It should be noted that the first splash screen image is time sensitive. When the server sends the first splash screen image, the client stores the first splash screen image and its first control information and, when the browser is started next time, the client processes the locally stored first control information and judges whether the first splash screen image should be displayed according to the valid time and invalid time of the first splash screen image.

204. Judge whether the current time is between the extracted valid time and invalid time.

If yes, the locally stored first splash screen image is valid and step 205 is executed;

If not, the locally stored first splash screen image is invalid and step 206 is executed;

In an embodiment of the invention, because the first splash screen image is time sensitive, it is necessary to judge whether the first splash screen image should be displayed according to its valid time and invalid time. Generally, the first splash screen image may be valid within a period of time. For example, when the first splash screen image is a splash screen image prompting about the National Day holidays, its valid time is 2010 Sep. 28 and invalid time is 2010 Oct. 7. If the browser is opened on 2010 Oct. 3, it can be judged that the date is between the valid time and the invalid time. This means that the first splash screen image is valid. If the browser is opened on 2010 Oct. 9, however, it can be judged that the date is not between the valid time and the invalid time. This means that the first splash screen image is invalid.

205. Display the first splash screen image;

In an embodiment of the invention, because there is a certain waiting time before the browser is opened, displaying the currently valid first splash screen image during the waiting time can maximize the current prompt information on the basis of enhanced browser functions.

206. Display the local default second splash screen image;

In the embodiment of the invention, when the first splash screen image is invalid, the local default second splash screen image may be displayed, which avoids a monotonous waiting image. The second splash screen image can be changed. When the client downloads a new second splash screen image from the server, the client may decide whether to override the second splash screen image.

In the foregoing steps 201-206, when the browser is opened, a splash screen image is played according to the locally stored control information of the splash screen image. This improves the visual effect when the software is applied and increases the amount of information available for the user. Besides, when necessary, some common prompts can be played to the user. The functions of the browser are thus enhanced.

Furthest, after step 201 where the browser is opened, the method may further include:

207. Send first information to the server, where the first information includes client basic information and image information of the first splash screen image;

In an embodiment of the invention, the client basic information includes the screen height and screen width of the local client and at least one client attribute. The client attributes include: location of the client, browser version, unique user identifier, and client type related information. The image information of the first splash screen image includes splash screen image content, valid time, invalid time, splash screen display time length, a splash screen image feature string and a control information feature string of the corresponding splash screen image.

Specifically, the screen height and screen width of the local client are the screen size of the local client. This size is also a consideration when the server matches a splash screen image. When matching a splash screen image for the client, the server may select a splash screen image corresponding to the client size and push the selected splash screen image to the client.

208. Receive second information returned by the server according to the client information. The second information includes a third splash screen image and control information of the third splash screen image, or control information of the first splash screen image stored by the server.

In an embodiment of the invention, after receiving the first information sent by the client, the server searches locally for a third splash screen image that matches the first information. Specifically, the first information includes the location of the client. Preferably, the location of the client may be obtained from the IP address of an access point where the user accesses the network and the location of the user is computed according to the IP address. Preferably, the location of the user may be obtained from a preset IP address database according to the IP address. In the server, different splash screen images are configured for different locations. For example, weather forecast splash screen images that prompt a typhoon or rainstorm may be configured for clients located in southern coastal areas. If the server detects that the location of the client is a southern coastal city, the server may select from the splash screen images configured for this location and meanwhile the server needs to consider the version of the browser (information of the version of the browser is also included in the client basic information in the first information). After this preliminary search, a splash screen image that is configured for the location of the client and corresponds to the browser version can be obtained. The obtained splash screen image is used as the third splash screen image. Further, if multiple images are found, a splash screen image of higher priority is selected as the third splash screen image that matches the first information. For example, there are currently two matched splash screen images, one is a mid-autumn festival prompt and the other is a National Day prompt. Because the two holidays span the same dates, the server defines one a high priority and the other a low priority. Suppose that the priority of the mid-autumn festival prompt is high, after the two splash screen images are found, the high priority mid-autumn festival prompt is downloaded.

In an embodiment of the invention, after receiving the first information sent by the client, the server searches locally for a third splash screen image that matches the first information. Specifically, the first information includes a feature string of the first splash screen image and a feature string of the control information stored by the client. If the feature string of the first splash screen image stored by the client is the same as the feature string of the third splash screen image found by the server currently, the contents of the two splash screen images are the same. The server judges whether the feature string of the first splash screen image in the first information is the same as the feature string of the locally stored third splash screen image. If yes, the first splash screen image stored by the client is the same as the locally stored third splash screen image, or else, the first splash screen image stored by the client is different from the locally stored third splash screen image. When the first splash screen image is the same as the locally stored third splash screen image, the server judges whether the control information stored by the client is the same as the locally stored control information. If the control information stored by the client is the same as the locally stored control information, the server does not send the second information. If the control information stored by the client is different from the locally stored control information, the server sends the locally stored control information of the first splash screen image to the client. In practice, it is possible that the image stored by the client has the same content as the splash screen image provided by the server but the valid time is different. In this event, the client uses the server stored control information of the first splash screen image to override the locally stored control information of the first splash screen image. Taking the above weather forecast for example, if the client stored splash screen image is an invalid rainstorm prompt while the splash screen image currently provided by the server is also a rainstorm prompt with changed valid time and invalid time, the server may send only the control information corresponding to the splash screen image to the client to save the network traffic.

209. Update the locally stored first splash screen image according to the second information, so that the first splash screen image is displayed according to the second information upon the next startup of the browser.

In an embodiment of the invention, when the second information includes the third splash screen image and the control information of the third splash screen image, it means that the first splash screen image stored by the client has become invalid and the client may use the third splash screen image to override the previous first splash screen image, and use the control information of the third splash screen image to override the previous control information of the first splash screen image. That is, the third splash screen image and the control information of the third splash screen image are retained as updated first splash screen image and the control information of the updated first splash screen image, respectively. Upon the next startup of the browser, the judgment process in steps 202-204 is executed and whether the updated first splash screen image is displayed or not is judged according to the judgment result.

When the second information includes the server stored control information of the first splash screen image, the content of the current first splash screen image is not changed while its control information is changed. Upon the next startup of the browser, the judgment process in steps 202-204 is executed and whether the first splash screen image is displayed or not is judged according to the judgment result.

When the browser is opened, a splash screen image is played to the user according to the locally stored control information of the splash screen image. This improves the visual effect when the software is applied and increases the amount of information available for the user. Besides, when necessary, some common prompts can be played to the user. The functions of the browser are thus enhanced.

Embodiment 3

Figure 3:
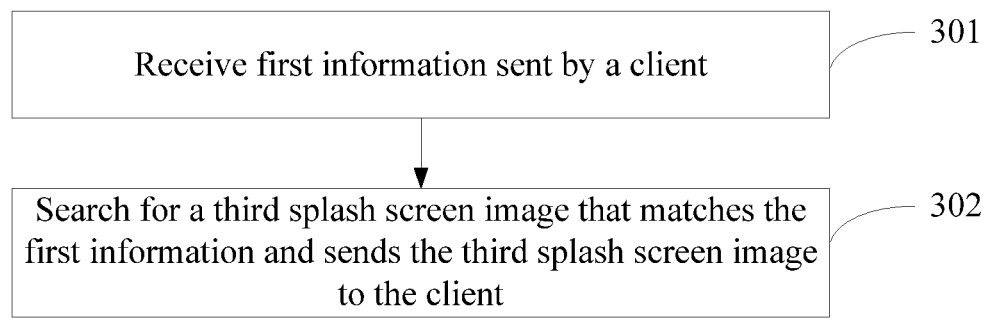
FIG. 3 is a flowchart of a method for sending a splash screen image according to an embodiment of the invention.

To enhance functions of a browser and make the browser more user friendly, an embodiment of the invention provides a method for sending a splash screen image, where the executing subject in the embodiment is a server. As shown in FIG. 3, the method includes:

301. Receive first information sent by a client, where the first information includes client basic information and image information of the first splash screen image.

302. Search for a third splash screen image that matches the first information and send the third splash screen image to the client.

When the browser is opened, a splash screen image is played according to the locally stored control information of the splash screen image. This improves the visual effect when the software is applied and increases the amount of information available for the user. Besides, when necessary, some common prompts can be played to the user. The functions of the browser are thus enhanced.

Embodiment 4

Figure 4:
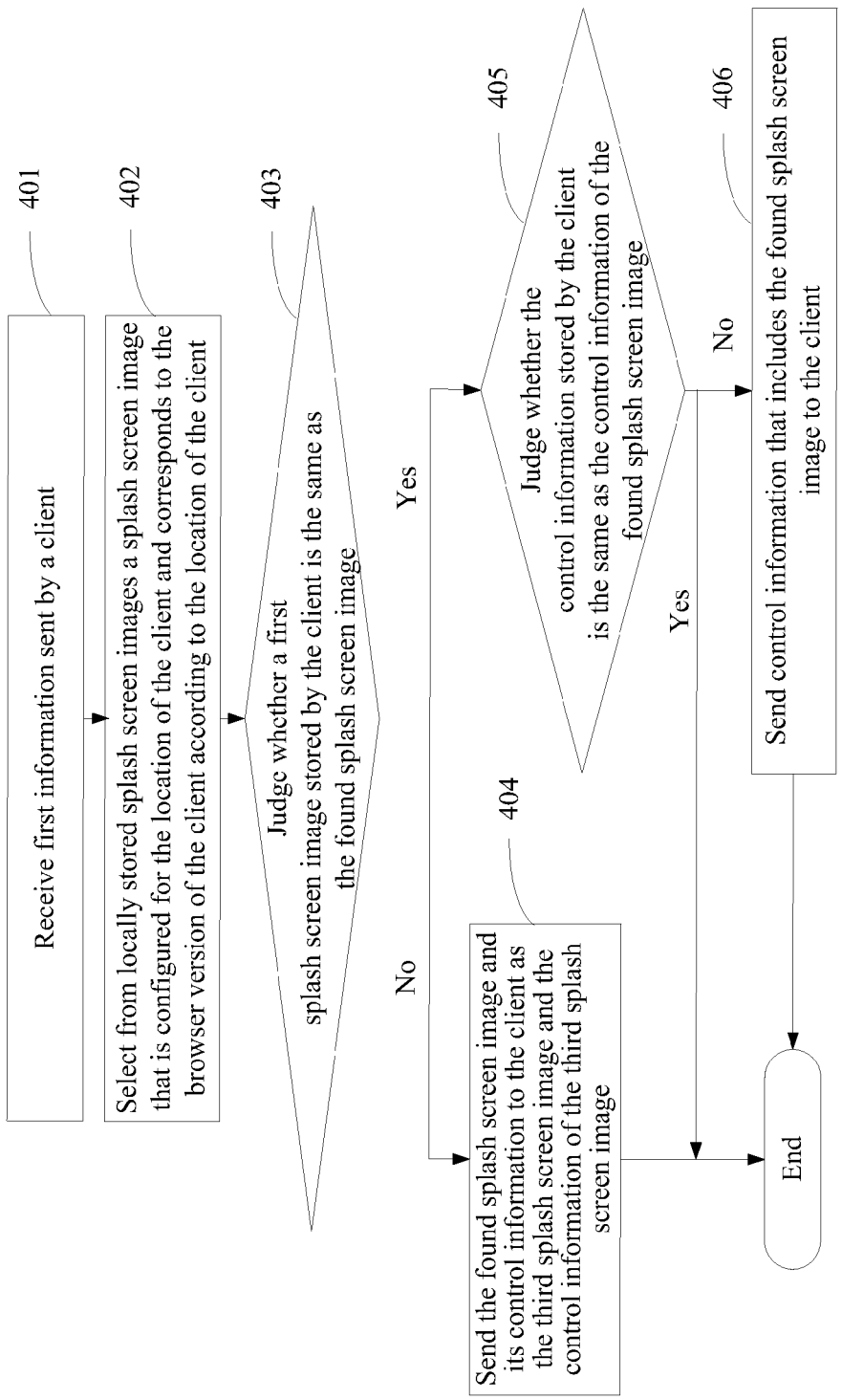
FIG. 4 is a flowchart of a method for sending a splash screen image according to an embodiment of the invention.

To enhance functions of a browser and make the browser more user friendly, an embodiment of the invention provides a method for sending a splash screen image, where the executing subject in the embodiment is a server. As shown in FIG. 4, the method includes:

401. Receive first information sent by a client, where the first information includes client basic information and image information of the first splash screen image;

In an embodiment of the invention, when the client opens the browser, the browser software sends the first information to the server. The purpose of this step is to notify the server of the state of the splash screen image currently stored by the client, so that the server judges whether to send a new splash screen image or control information to the client according to the first information.

402. Select from locally stored splash screen images a splash screen image that is configured for the location of the client and corresponds to the browser version of the client according to the location of the client;

Further, when there are multiple splash screen images that are configured for the location and correspond to the browser version, a splash screen image of higher priority is selected.

Further, when searching for images, the server may obtain the most suitable image according to the received screen size of the client to increase the adaptability of the splash screen image. In addition, the server may convert the size of the splash screen image to be sent according to the received screen size of the client to change the splash screen image to a splash screen image that suits the screen size of the client and then send the converted splash screen image to the client.

Those skilled in the art know that the server can configure splash screen images for browser versions and locations on a web page platform. A load command is sent from the web side to the splash screen server so that a splash screen image is loaded to the memory of the server.

403. Judge whether a first splash screen image stored by the client is the same as the found splash screen image; if yes, step 405 is executed;

If not, step 404 is executed;

In an embodiment of the invention, image information of the first splash screen image stored by the client includes a first splash screen image feature string and a first control information feature string. Correspondingly, whether the first splash screen image stored by the client is the same as the found splash screen image is judged according to the client information. Specifically, this includes: judging whether the first splash screen image feature string in the client information is the same as the feature string of the found splash screen image; if the first splash screen image feature string in the client information is the same as the feature string of the found splash screen image, the first splash screen image stored by the client is the same as the found splash screen image according to the client information; otherwise, if the first splash screen image feature string in the client information is not the same as the feature string of the found splash screen image, the first splash screen image stored by the client is different from the found splash screen image according to the client information.

404. Send the found splash screen image and its control information to the client as the third splash screen image and the control information of the third splash screen image. The process is ended.

405. Judge whether the control information stored by the client is the same as the control information of the found splash screen image; if yes, the second information is not sent and the process is ended;

If no, step 406 is executed;

In an embodiment of the invention, image information of the first splash screen image stored by the client includes a first splash screen image feature string and a control information feature string. Correspondingly, judging whether the control information stored by the client is the same as the control information of the found splash screen image includes: judging whether the control information feature string in the client information is the same as the control information feature string of the found splash screen image; if the control information feature string in the client information is the same as the control information feature string of the found splash screen image, the control information stored by the client is the same as the control information of the found splash screen image; otherwise, if the control information feature string in the client information is not the same as the control information of the found splash screen image, the control information stored by the client is different from the control information of the found splash screen image.

406. Send control information that includes the found splash screen image to the client.

In an embodiment of the invention, the server returns second information according to the client information, where the second information includes: a third splash screen image and control information of the third splash screen image, or control information of the first splash screen image stored by the server. After receiving the second information, if the second information is the control information of the first splash screen image stored by the server, the client updates its first splash screen image according to the second information, so that the updated first splash screen image can be displayed according to the second information upon the next startup of the browser.

After the image information sent by the client is received, a splash screen image is provided to the user according to the locally stored splash screen image. This improves the visual effect when the software is applied and increases the amount of information available for the user. Besides, when necessary, some common prompts can be played to the user. The functions of the browser are thus enhanced.

Embodiment 5

Figure 5:
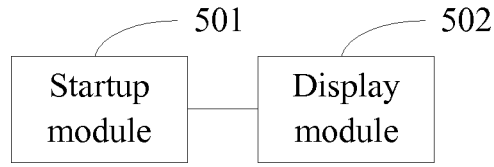
FIG. 5 is a schematic structure diagram of an apparatus for sending a splash screen image according to an embodiment of the invention.

To enhance functions of a browser and make the browser more user friendly, an embodiment of the invention provides an apparatus for opening a browser. As shown in FIG. 5, the apparatus includes:

a startup module 501, configured to receive a signal for starting up a browser and open the browser; and a display module 502, configured to judge whether a locally stored first splash screen image is valid at the current time and if yes, display the first splash screen image, or if not, display a local default second splash screen image.

Figure 6:
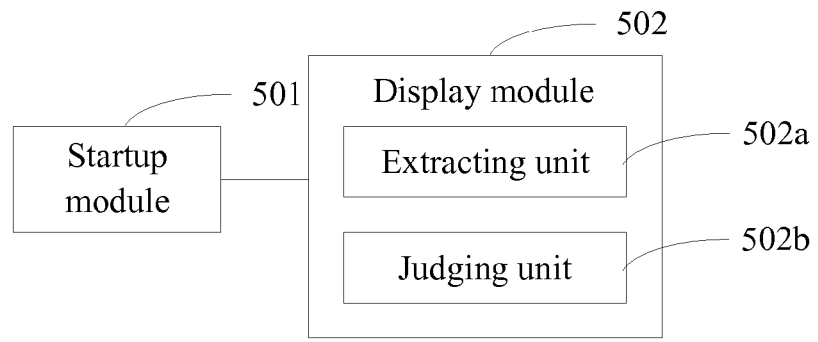
FIG. 6 is a schematic structure diagram of an apparatus for sending a splash screen image according to an embodiment of the invention.

As shown in FIG. 6, the display module 502 includes specifically:

an extracting unit 502a, configured to extract the valid time and invalid time of the locally stored first splash screen image; and a judging unit 502b, configured to judge whether the current time is between the extracted valid time and invalid time and if yes, determine that the locally stored first splash screen image is valid, or if not, determine that the locally stored first splash screen image is invalid.

Figure 7:
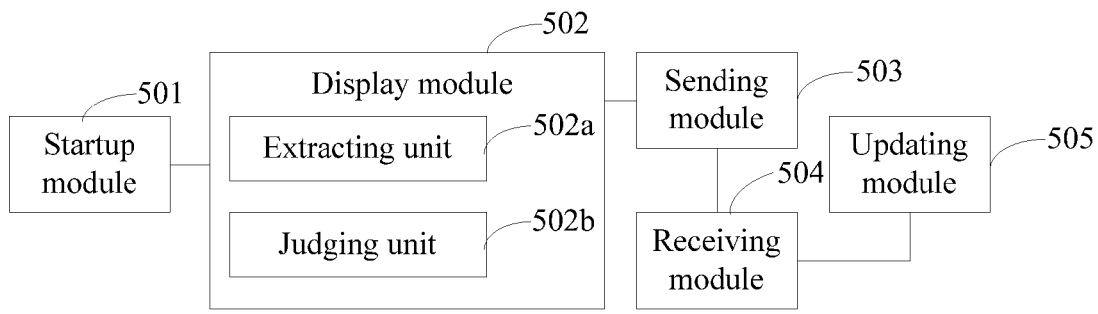
FIG. 7 is a schematic structure diagram of an apparatus for sending a splash screen image according to an embodiment of the invention.

As shown in FIG. 7, the apparatus further includes:

a sending module 503, configured to send first information to the server, where the first information includes client basic information and image information of the first splash screen image;

a receiving module 504, configured to receive second information returned by the server according to the first information; and an updating module 505, configured to update the locally stored first splash screen image according to the second information.

The second information includes control information of the first splash screen image or a third splash screen image and control information of the third splash screen image sent by the server. Accordingly, the updating module 505 is specifically configured to update the control information of the first splash screen image according to the server sent control information of the first splash screen image; or save the third splash screen image and the control information of third splash screen image as the first splash screen image and the control information of the first splash screen image.

The apparatus provided in this embodiment of the invention may specifically be a mobile client based on the same idea of the method embodiments. The specific implementation is described in the method embodiments and will not be repeated here.

Figure 8:
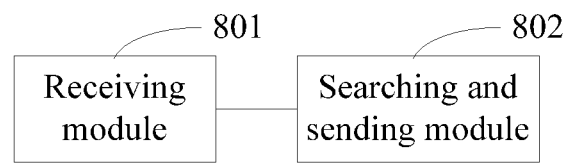
FIG. 8 is a schematic structure diagram of a server according to an embodiment of the invention.

An embodiment of the invention provides a server. As shown in FIG. 8, the server includes:

a receiving module 801, configured to receive first information sent by a client, where the first information includes client basic information and image information of a first splash screen image;

a searching and sending module 802, configured to search for a third splash screen image that matches the first information and send the third splash screen image to the client.

Figure 9:
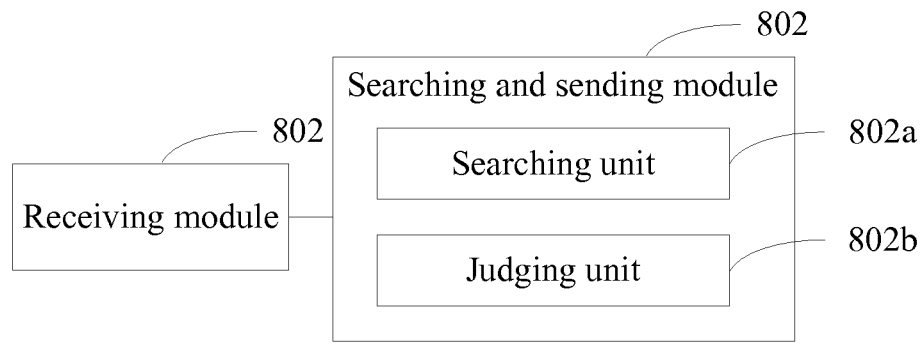
FIG. 9 is a schematic structure diagram of a server according to an embodiment of the invention.

As shown in FIG. 9, the image information of the first splash screen image includes a first splash screen image feature string and accordingly, the searching and sending module 802 includes:

a searching unit 802a, configured to search for a splash screen image that matches the client basic information; and a judging unit 802b, configured to judge whether the first splash screen image feature string is the same as the image feature string of the found splash screen image and if not, use the found splash screen image as the third splash screen image.

The searching unit 802a is specifically configured to select from locally stored splash screen images a splash screen image that is configured for the location of the client and corresponds to a browser version of the client according to the location of the client.

The searching and sending module 802 is further configured to, when there are multiple splash screen images that are configured for the location of the client and correspond to the browser version, select a splash screen image of higher priority.

The judging unit 802b is further configured to, when the first splash screen image feature string is the same as the image feature string of the found splash screen image, judge whether the control information feature string of the first splash screen image is the same as the control information feature string of the found splash screen image, and if not, use the found splash screen image as the third splash screen image and send it to the client.

The server provided in this embodiment of the invention is based on the same idea of the method embodiments. The specific implementation is described in the method embodiments and will not be repeated here. When the image information sent by the client is received, a splash screen image is provided to the user according to the locally stored splash screen image. This improves the visual effect when the software is applied and increases the amount of information available for the user. Besides, when necessary, some common prompts can be played to the user. The functions of the browser are thus enhanced.

Those skilled in the art understand that all or a portion of the steps in the foregoing embodiments of the invention may be implemented by hardware or implemented by related hardware under the instruction of a program. The program may be stored in a computer readable storage medium, such as a read-only memory, a magnetic disk, or a compact disk.

Although the present invention has been described in detail through some exemplary embodiments, the invention is not limited to such embodiments. It is apparent that those skilled in the art can make various modifications and variations to the invention without departing from the spirit and principle of the present invention. The invention is intended to cover the modifications and variations provided that they fall within the scope of protection defined by the claims or their equivalents.

The invention claimed is:

1. A method for opening a browser, comprising:
receiving, by a processor of an apparatus for opening the browser, a signal for starting up a browser and opening the browser; and
judging, by the processor, whether a locally stored first splash screen image is valid at a current time and if yes, displaying, by the processor, the first splash screen image, or if not, displaying, by the processor, a local default second splash screen image;
after the opening the browser, further comprising:
sending, by the processor, first information to a server, wherein the first information comprises client basic information and image information of the first splash screen image, wherein the client basic information comprises a screen size of the client and a client attribute, wherein the client attribute comprises at least one of a location of the client, a browser version, a unique user identifier and client type related information, wherein the image information of the first splash screen image comprises at least one of splash screen image content, valid time, invalid time, splash screen display time length, a splash screen image feature string and a control information feature string of the first splash screen image;
receiving, by the processor, second information returned by the server according to the first information; and
updating, by the processor, the locally stored first splash screen image according to the second information.

2. The method according to claim 1, wherein the judging, by the processor, whether a locally stored first splash screen image is valid at the current time comprises:
extracting, by the processor, valid time and invalid time of the locally stored first splash screen image; and
judging, by the processor, whether the current time is between the extracted valid time and invalid time and if yes, judging, by the processor, that the locally stored first splash screen image is valid, or if not, judging, by the processor, that the locally stored first splash screen image is invalid.

3. The method according to claim 1, wherein the second information comprises: control information of the first splash screen image or a third splash screen image and control information of the third splash screen image sent by the server, and accordingly, wherein the updating, by the processor, the locally stored first splash screen image according to the second information comprises:
updating, by the processor, the control information of the first splash screen image according to the control information of the first splash screen image sent by the server; and
saving, by the processor, the third splash screen image and the control information of the third splash screen image as the first splash screen image and the control information of the first splash screen image.

4. The method according to claim 3, wherein the control information comprises at least one of splash screen image content, valid time, invalid time, splash screen display time length, a splash screen image feature string and a control information feature string of the corresponding splash screen image.

5. A method for sending a splash screen image, comprising:
- receiving, by a processor of a server, first information sent by a client, wherein the first information comprises client basic information and image information of a first splash screen image, wherein the client basic information comprises a screen size of the client and a client attribute, wherein the client attribute comprises at least one of a location of the client, a browser version, a unique user identifier and client type related information, wherein the image information of the first splash screen image comprises at least one of splash screen image content, valid time, invalid time, splash screen display time length, a splash screen image feature string and a control information feature string of the first splash screen image; and
- searching, by the processor, for a third splash screen image that matches the first information and sending the third splash screen image to the client.

6. The method according to claim 5, wherein the image information of the first splash screen image comprises a first splash screen image feature string and accordingly, the searching, by the processor, for a third splash screen image that matches the first information comprises:
- searching, by the processor, for a splash screen image that matches the client basic information; and
- judging, by the processor, whether the first splash screen image feature string is the same as the image feature string of a found splash screen image and, if not, using the found splash screen image as the third splash screen image.

7. The method according to claim 6, wherein the searching, by the processor, for a splash screen image that matches the client basic information comprises:
- selecting, by the processor, from locally stored splash screen images a splash screen image that is configured for a location of the client and corresponds to a browser version of the client according to the location of the client.

8. The method according to claim 7, after the selecting, by the processor, from locally stored splash screen images a splash screen image that is configured for the location of the client and corresponds to the browser version of the client according to the location of the client, further comprising:
- when there are multiple splash screen images that are configured for the location of the client and correspond to the browser version, selecting, by the processor, a splash screen image of higher priority.

9. The method according to claim 6, wherein the image information of the first splash screen image comprises a first splash screen image feature string and the searching, by the processor, for a third splash screen image that matches the first information comprises:
- when the first splash screen image feature string is the same as an image feature string of the found splash screen image, judging, by the processor, whether the control information feature string of the first splash screen image is the same as a control information feature string of the found splash screen image, and if not, using, by the processor, the found splash screen image as the third splash screen image and sending, by the processor, the third splash screen image to the client.

10. An apparatus for opening a browser, comprising: a processor and a non-transitory computer readable storage medium, wherein the non-transitory computer readable storage medium comprising computer program codes which when executed by the processor cause the processor to execute steps comprising:
- receiving a signal for starting up a browser and open the browser; and
- judging whether a locally stored first splash screen image is valid at a current time and if yes, displaying the first splash screen image, or if not, displaying a local default second splash screen image;
- wherein the processor is further caused to execute steps comprising:
- sending first information to a server, wherein the first information comprises client basic information and image information of the first splash screen image, wherein the client basic information comprises a screen size of the client and a client attribute, wherein the client attribute comprises at least one of a location of the client, a browser version, a unique user identifier and client type related information, wherein the image information of the first splash screen image comprises at least one of splash screen image content, valid time, invalid time, splash screen display time length, a splash screen image feature string and a control information feature string of the first splash screen image;
- receiving second information returned by the server according to the first information; and
- updating the locally stored first splash screen image according to the second information.

11. The apparatus according to claim 10, wherein the processor is further caused to execute steps comprising:
- extracting valid time and invalid time of the locally stored first splash screen image; and
- judging whether the current time is between the extracted valid time and invalid time and if yes, judging that the locally stored first splash screen image is valid, or if not, judging that the locally stored first splash screen image is invalid.

12. The apparatus according to claim 10, wherein the second information comprises: control information of the first splash screen image or a third splash screen image and control information of the third splash screen image sent by the server, and accordingly, the processor is further caused to execute steps comprising:
- updating the locally stored first splash screen image according to the server sent control information of the first splash screen image; and
- saving the third splash screen image and the control information of the third splash screen image as the first splash screen image and the control information of the first splash screen image.

13. A server, comprising: a processor and a non-transitory computer readable storage medium, wherein the non-transitory computer readable storage medium comprising computer program codes which when executed by the processor cause the processor to execute steps comprising:
- receiving first information sent by a client, wherein the first information comprises client basic information and image information of a first splash screen image, wherein the client basic information comprises a screen size of the client and a client attribute, wherein the client attribute comprises at least one of a location of the client, a browser version, a unique user identifier and client type related information, wherein the image information of the first splash screen image comprises at least one of splash screen image content, valid time, invalid time, splash screen display time length, a splash screen image feature string and a control information feature string of the first splash screen image; and searching for a third splash screen image that matches the first information and sending the third splash screen image to the client.

14. The server according to claim 13, wherein the image information of the first splash screen image comprises a first splash screen image feature string and accordingly, the processor is further caused to execute steps comprising:

searching for a splash screen image that matches the client basic information; and judging whether the first splash screen image feature string is the same as the image feature string of the found splash screen image and, if not, using a found splash screen image as the third splash screen image.

15. The server according to claim 14, wherein the processor is further caused to execute steps comprising: when the first splash screen image feature string is the same as a image feature string of the found splash screen image, judging whether the control information feature string of the first splash screen image is the same as a control information feature string of the found splash screen image, and, if not, using the found splash screen image as the third splash screen image and sending the third splash screen image to the client.

16. The server according to claim 14, wherein the processor is further caused to execute a step of selecting from locally stored splash screen images a splash screen image that is configured for a location of the client and corresponds to a browser version of the client according to the location of the client.

17. The server according to claim 16, wherein the processor is further caused to execute a step of when there are multiple splash screen images that are configured for the location of the client and correspond to the browser version, selecting a splash screen image of higher priority.

* * * * *